(12) United States Patent
Allen et al.

(10) Patent No.: US 6,598,253 B1
(45) Date of Patent: Jul. 29, 2003

(54) EXTENDABLE RAMP ASSEMBLY FOR DETECTING AN OBSTRUCTION AND RESPONDING THERETO

(76) Inventors: Robert John Allen, 101 Stokes Road, East Ham, London (GB); George David Allen, Anchor & Hope Lane, Charlton, London (GB)

( * ) Notice: Subject to any disclaimer, the term of this patent is extended or adjusted under 35 U.S.C. 154(b) by 0 days.

(21) Appl. No.: 09/530,613

(22) PCT Filed: Oct. 5, 1999

(86) PCT No.: PCT/GB99/03282

§ 371 (c)(1),
(2), (4) Date: Jun. 26, 2000

(87) PCT Pub. No.: WO00/20252

PCT Pub. Date: Apr. 13, 2000

(30) Foreign Application Priority Data

Oct. 5, 1998 (GB) ............................................. 9821674

(51) Int. Cl.[7] ................................................. E01D 1/00
(52) U.S. Cl. ........................... 14/71.1; 14/69.5; 414/537
(58) Field of Search ................... 14/69.5, 71.1; 414/537; 296/61; D34/32

(56) References Cited

U.S. PATENT DOCUMENTS

| | | | | |
|---|---|---|---|---|
| 4,386,398 A | * | 5/1983 | Matsuoka et al. | 318/266 |
| 4,533,905 A | * | 8/1985 | Leivenzon et al. | 340/524 |
| 4,701,684 A | * | 10/1987 | Seidel et al. | 318/282 |
| 4,907,222 A | * | 3/1990 | Slavik | 307/10.1 |
| 5,331,701 A | * | 7/1994 | Chase et al. | 14/71.1 |
| 5,472,306 A | * | 12/1995 | Stoll et al. | 414/537 |
| 5,636,399 A | * | 6/1997 | Tremblay et al. | 14/71.1 |
| 5,676,515 A | * | 10/1997 | Haustein | 14/69.5 |
| 5,775,232 A | * | 7/1998 | Golemis et al. | 105/458 |
| 5,832,555 A | * | 11/1998 | Saucier et al. | 14/71.1 |
| 6,064,165 A | * | 5/2000 | Boisvert et al. | 318/465 |
| 6,118,243 A | * | 9/2000 | Reed et al. | 318/282 |
| 6,120,234 A | * | 9/2000 | Dinverno | 14/71.1 |

FOREIGN PATENT DOCUMENTS

| | | | |
|---|---|---|---|
| DE | 88 15 693.1 | * | 2/1989 |
| DE | 41 34 559 | * | 4/1993 |
| DE | 43 30 638 | * | 3/1995 |
| GB | 2 286 813 | * | 2/1995 |
| GB | 2 286 813 | * | 8/1995 |
| GB | 2 306 436 | * | 5/1997 |

* cited by examiner

*Primary Examiner*—Gary Hartmann
(74) *Attorney, Agent, or Firm*—Andrus, Sceales, Starke & Sawall, LLP

(57) ABSTRACT

An extendable ramp assembly includes a chassis, a first ramp slidably movable relative to the chassis and hingably connected to the chassis, and a second ramp carried by the first ramp and movable relative to the chassis and the first ramp. Separate structure is provided for extending and retracting both the first and second ramps. A first mechanism is provided for detecting whether either or both of the first and second ramps abuts an obstruction when at least one of the ramps is being extended. A second mechanism is provided for stopping the extension of at least one of the ramps or for retracting at least one of the ramps in the event of the detecting mechanism detecting the obstruction.

12 Claims, 4 Drawing Sheets

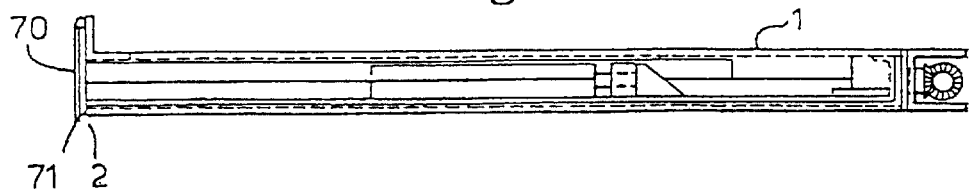
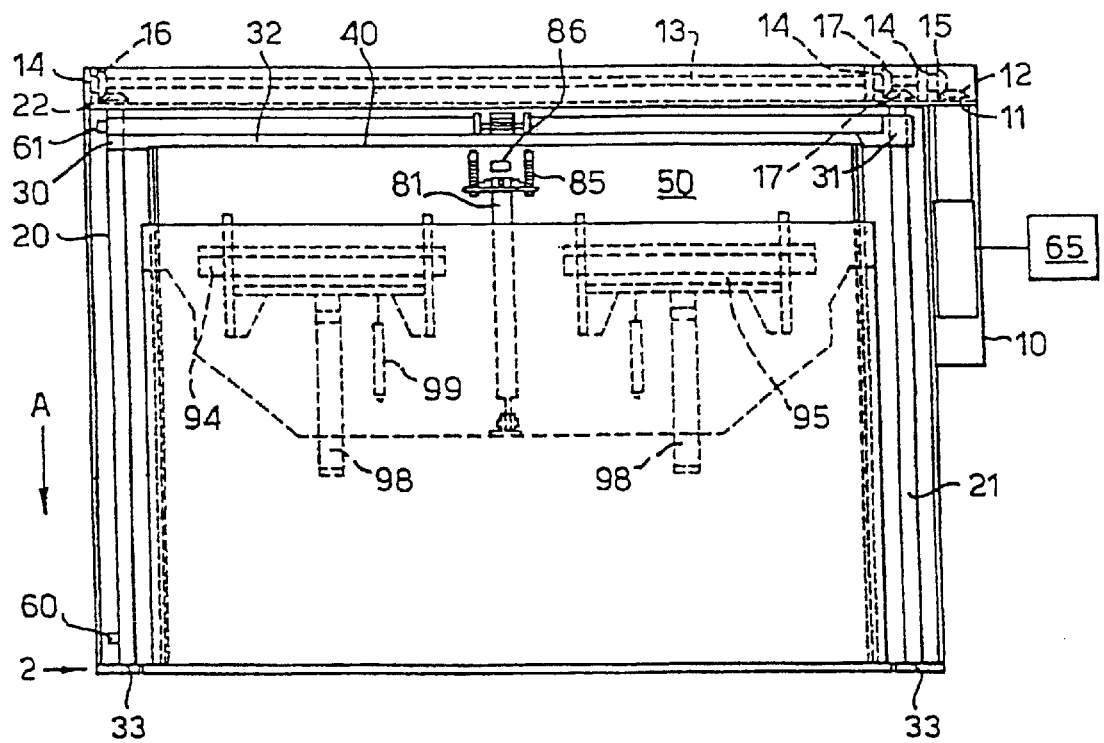

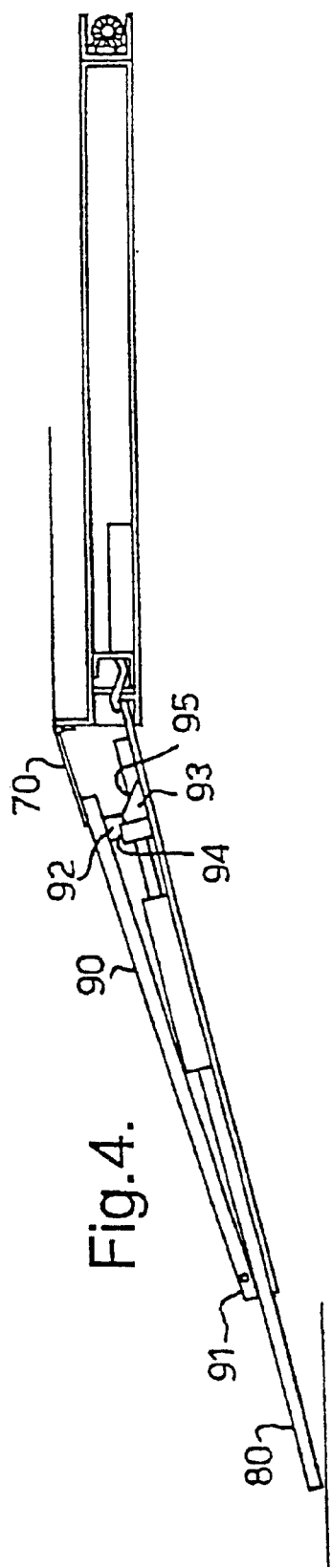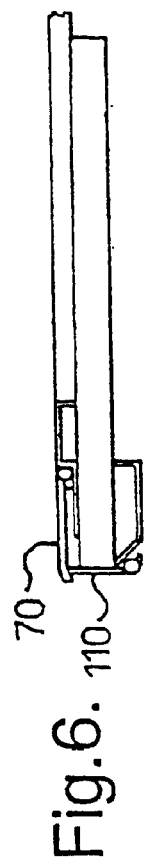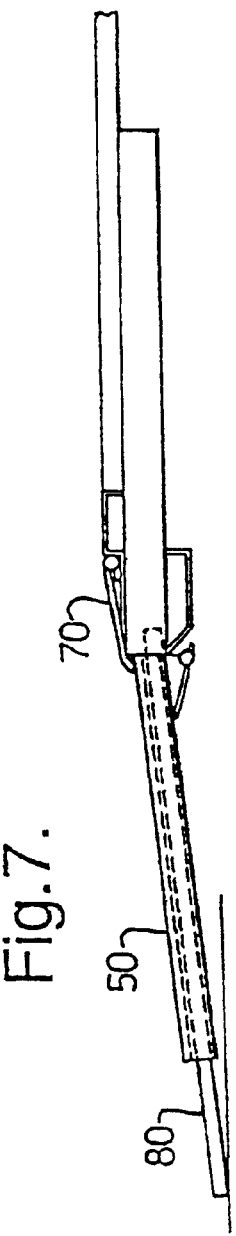

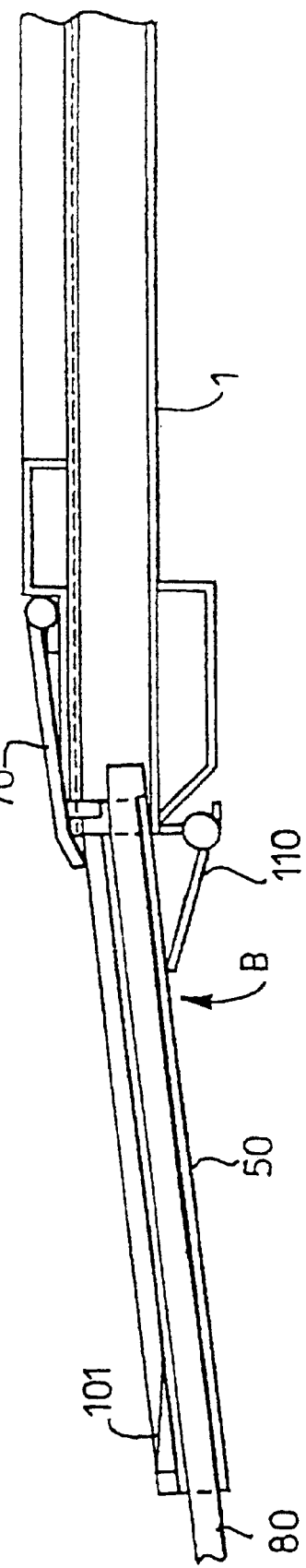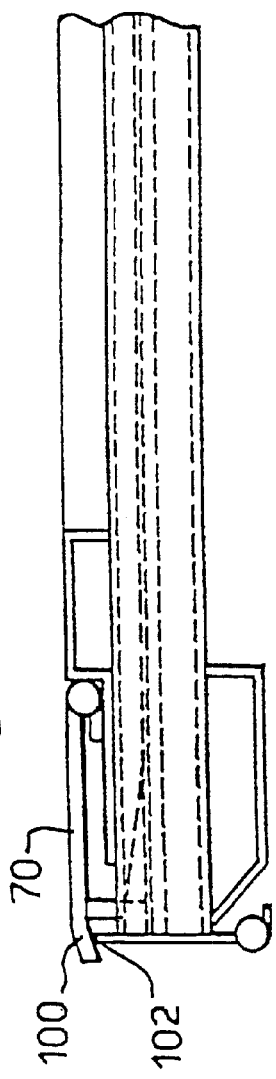

EXTENDABLE RAMP ASSEMBLY FOR DETECTING AN OBSTRUCTION AND RESPONDING THERETO

FIELD OF THE INVENTION

This invention relates to a ramp. More especially but not exclusively the ramps are for entrance to or egress from vehicles. The ramp of the invention can however be used in other application such as for entrance to or egress from buildings.

BACKGROUND AND SUMMARY OF THE INVENTION

According to the invention there is provided an extendible ramp comprising:

i) a chassis;

ii) a first ramp slidable movable relative to the chassis and hingable connected to the chassis;

iii) a second ramp carried by the first ramp and movable relative to the chassis and the first ramp;

iv) means for extending and retracting the first ramp;

v) means for extending and retracting the second ramp;

vi) means for detecting whether the ramp abuts an obstruction when the ramp is being extended; and vii) means for retracting the ramp if it abuts an obstruction during extension.

The first ramp can be hingably connected to a linking member movable relative to the chassis.

A ramp can be movable by a rotatable leadscrew received in a feed nut.

The feedscrew can be driven by an electric motor. Means for monitoring the current drawn by the motor can be provided. Means for stopping or reversing the motor if the current drawn exceeds a predetermined value can be provided.

The second ramp can be slidably receivable within the first ramp.

Means for extending a ramp or a member can be resiliently biased away from a switch such that when load on the extending means or members exceeds a predetermined value the switch is actuated actuating means for stopping or retracting the ramp.

A top face of a ramp can be pivotally mounted. Means for urging the face to a pivotted position and means for biasing the face away from a pivoted position can be provided.

BRIEF DESCRIPTION OF THE DRAWINGS

Embodiments of the invention will be described by way of non-limiting example by reference to the accompanying figures of which:

FIG. 1 is a side elevation of a first embodiment in a retracted configuration;

FIG. 2 is a cutaway plan view of the embodiment of FIG. 1;

FIG. 4 is a side elevation of the embodiment of FIG. 1 with the face pivoted;

FIG. 6 is a side elevation of a second embodiment in a retracted configuration;

FIG. 7 is a side elevation of a second embodiment in an extended configuration;

FIG. 8 is an enlarged partially cutaway side view of the embodiment of FIG. 6 in an extended configuration; and FIG. 9 is an enlarged partial side view of the embodiment of FIG. 8 in a retracted configuration.

DETAILED DESCRIPTION OF THE INVENTION

Figure 3:
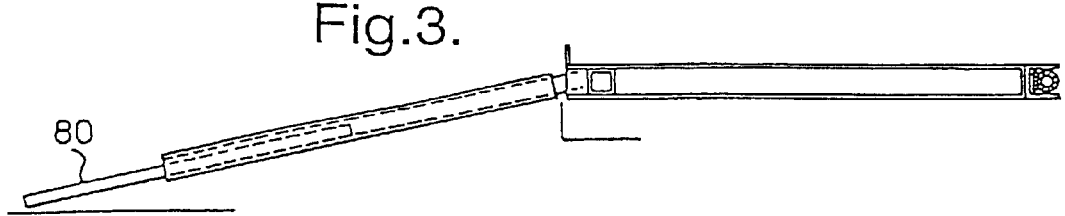
FIG. 3 is a side elevation of the embodiment of FIG. 1 with the first and second ramps deployed.
Figure 5:
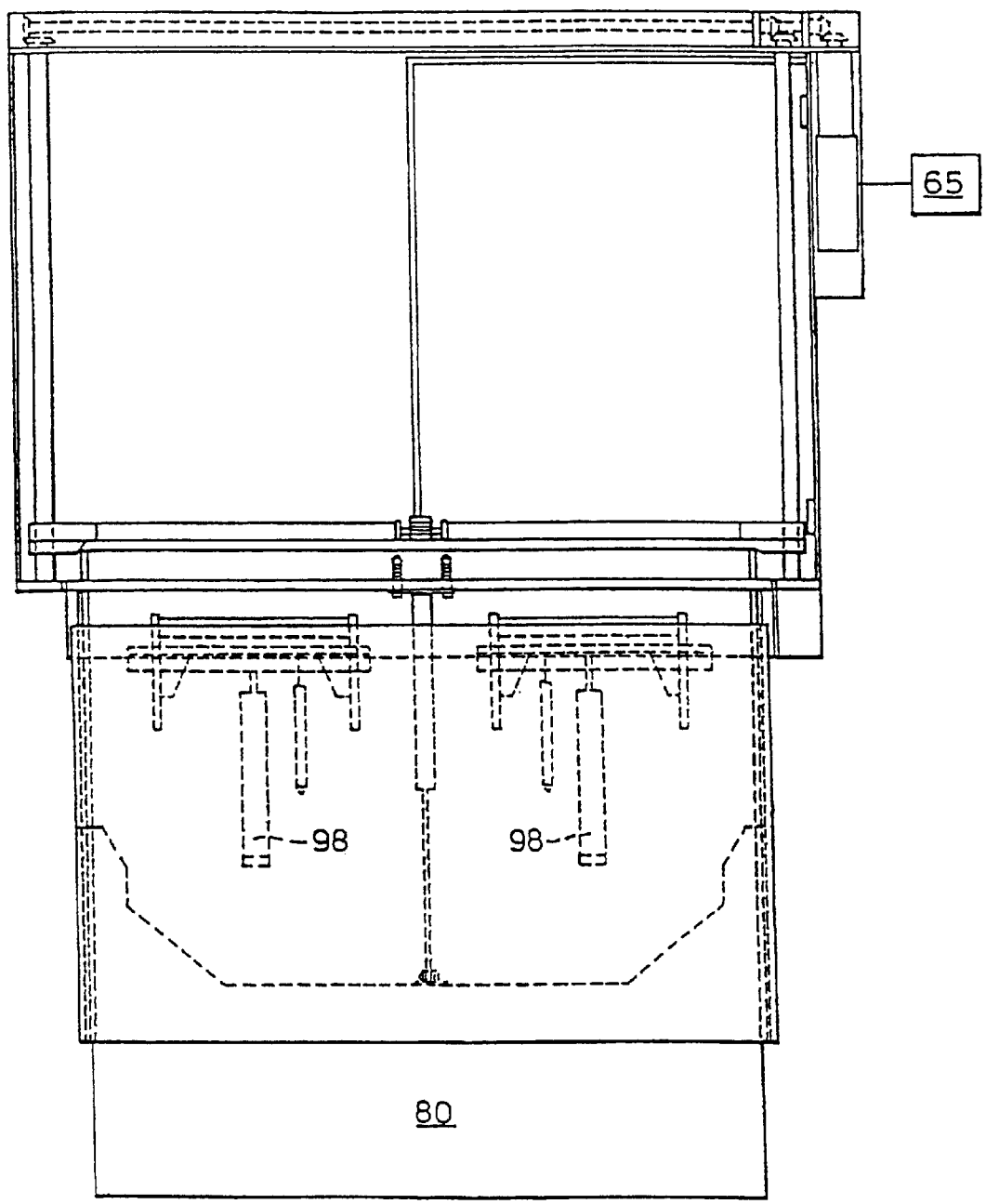
FIG. 5 is a top plan of the embodiment of FIG. 1 with first and second ramps deployed.

The illustrated embodiment is primarily intended for fitment to a low floor bus.

Cassette 1 is provided for a mounting of operative components of the ramp. The ramp can be supplied to vehicle builders for inclusion in the vehicle at an early stage of construction or retrofitted to an existing vehicle.

Cassette 1 is secured to the vehicle for example by screw threaded fasteners with edge 2 about flush with the vehicle side.

Motor 10 is provided. In the illustrated embodiment this motor is a low voltage dc motor. It will be apparent to the skilled however that other motors, such as air and hydraulic motors could be provided.

Drive shaft 11 of motor 10 is provided with a bevel gear 12. Second drive shaft 13 is mounted for rotation in bearings 14. Drive shaft 13 provided with a plurality of bevel gears, 15, 16, 17. Second bevel gear 15 is in meshing engagement with bevel gear 12 such that actuation of motor 10 causes second drive sheet 13 to rotate.

First and second lead screws 20, 21 are provided about perpendicular to second drive shaft 13. Lead screws 20, 21 are each provided with a bevel gear 22, 23. Third bevel gear 16 of second drive shaft 13 is in meshing engagement with fifth bevel gear 22 of first lead screw 20.

Fourth bevel gear 17 of second drive shaft is in meshing engagement with sixth bevel gear of second lead screw.

A first feed nut 30 is in meshing engagement with first lead screw 20 and second feed nut 31 is in meshing engagement with second lead screw 21. Linking member 32 extends between first and second feed nuts 30, 31.

Actuation of motor 10 thus causes linking member 32 to move in direction of arrow A.

Those skilled in the art will have little difficulty in devising other ways of providing a linearly movable linking member 32.

In preferred embodiments of the invention the end of one or both feed screw is provided with a dog 33. Engagement of dog 33 with a tool allows linking member to be moved in the event of failure of actuating motor 10. This is useful in emergencies for example if motor 10 fails. The shape of dog 33 is not critical for the purposes of the invention. Slots engagable by bladed tools or male or female squares or hexagons can be used. In some cases it is desirable to use a standard square for example corresponding to the drive shaft of a torque or ratchet wrench. However when used in public service vehicles with a roster of drivers the tool may be subject to loss by petty theft. To reduce the likelihood of this a dog of special shape with a tool of corresponding shape can be provided.

Hinge 40 is provided on the edge of linking member 32 nearer the edge. In the illustrated this comprises a strip of flexible polyurethane. Those skilled in the art will have no difficulty in devising other hinges.

First ramp 50 is hingably mounted of linking member 32 by hinged member 40. Actuation of motor 10 thus causes first ramp 50 to be extended or retracted.

A position sensor for sensing the position of ramp 50 is provided. In the illustrated embodiment the position sensor comprises microswitches 60, 61 adjacent the lead screws toward the ends of the lead screws. As the ramp is extended or retracted to the limit of normal operation linking member 32 or feed nuts actuate the microswitches. A control unit 65 can then switch off motor 10 and, as will be apparent hereafter control other features of the invention.

In some embodiments of the invention control unit 65 monitors the current drawn by motor 10. If movement of the ramp is inhibited for example by contacting a person motor 10 draws a higher current. The control unit senses this and if the current exceeds a predetermined value control unit 65 either switches off or reverses motor 10.

Those skilled in the art will have little difficulty in devising suitable control units. A preferred system uses the multiplexing scheme described in U.S. Pat. No. 4,907,222 the disclosure of which is incorporated herein by reference. By way of example control unit 65 may comprise lo an Intellitec PMC CPU 98A and two Intellitec PMC I/O Modules.

Edge 2 of the cassette 1 is provided with a resiliently biased flap 70. The resilient bias urges the flap to close slot 71 through which the first ramp 50 can be projected by motor 10. Flap 70 serves a number of purposes. Flap 70 improves the aesthetic appearance of the vehicle. Flap 70 reduces the amount of dirt and water entering the cassette. Flap 70 reduces the height of the step between the platform of the vehicle and the ramp.

The top surface of ramp 50 is generally provided with a ribbed surface or other textured surface which may be resilient to improve traction of people and vehicles such as wheelchairs ascending or descending the ramp 50. Second ramp 80 is received in the first ramp 50 when the ramp as a whole is retracted. Second ramp 80 is slidably movable relative to the first ramp. In the illustrated embodiment this is achieved by providing slide guides 81 at the edges of the first in which are received the edges of second ramp.

In the illustrated embodiment second ramp 80 is actuated by a pneumatic ram 81. It will be appreciated however that other ways of actuating the ramp can be used examples include hydraulic rams and electric motors. In response to a command from control unit 65, ram 81 is actuated. In general the first ram will be partially extended at this point. It will be understood however that this is primarily a matter of convenience.

Desirably second ramp is retractable in the event that it contacts an obstruction. In the illustrated embodiment ram 81 is mounted resiliently on the first ramp. Resilient bias 85 urges ram 81 away from microswitch or other actuator 86. The bias is sufficiently strong that actuation of the ram 81 does not cause ram 81 to actuate actuator 86 unless the ramp meets an obstruction. In a similar manner to that described hereinbefore control unit 65 can then cause ram 81 to stop or retract.

Face 90 of second ramp 85 is pivotally mounted on the ramp 85 toward the outer edge 91. The underside of face 90 is provided with a first wedge 92. Second wedge 93 is provided on the ramp. Faces 94, 95 of the first and second wedges abut. The first and second wedges are relatively movable. In the illustrated embodiment second wedge 93 is movable. Movement of the wedges in a first direction urges the face 90 upwardly. This provides a more even ramp than would otherwise be the case. In the illustrated embodiment second wedge is actuated by a second pneumatic ram 98 controlled by control unit 65. Those skilled in the art will have little difficulty in devising other suitable ways of actuating the second wedge such as electric motors or hydraulic cylinders. Preferably, as is shown the illustrated embodiment, a resilient bias 99 is provided urging the second ram to a position in which the face is not raised. In this arrangement if supply of air to the ram fails face 90 will retract allowing the ramp to be stowed. It will be apparent that it is important for face 90 not to be pivoted until its free edge is sufficiently advanced for it not to fail. Similarly the face should be allowed to retract before second ramp is withdrawn. Those skilled in the art will have no difficulty in devising suitable ways in which control unit 65 can ensure that this is the case.

In some embodiments of the invention face 90 is not pivotally movable.

FIGS. 6 to 9 illustrate an embodiment of this kind. Face 90 is not pivotally mounted and consequently second pneumatic ram resilient bias and first and second wedges are not provided.

Flap 90 is provided with nose 100. A cam track 101 is provided towards the end of the first ramp. Nose 100 of the flap engages cam track 101. A second flap 110 is also provided. Second flap is resiliently mounted on the bottom of the first ramp. A resilient bias urges the second flap in the direction of arrow B to close the slot through which the second ramp extends. The free tip 102 engages nose 100. In the closed configuration the arrangement is as shown in FIG. As the first ramp extends the resilient bias of the first and second flaps is overcome. The first ramp descends the cam track and abuts the top surface of the ramp providing a relatively obstruction free surface and second flap is urged outwardly. FIG. 8 shows the ramp extended. As the ramp is retracted the ends of the ramps move in board of the tip of the second flap. The resilient bias causes the flap to rotate in the direction of arrow B. The first ramp is moved upwardly as the nose engage the cam track. This allows the second flap to rotate fully home before the resilient bias urges the first flap into the position shown in FIG. 9.

In some embodiments of the invention a hole is provided near the front edge of the second ramp. A tool can be provided having an arm receivable in the hole. This allows the second ramp to be deployed or stowed manually if desired.

In some embodiments sensors are provided to sense the condition of one or more of the handbrake, the speed of the vehicle and the vehicle doors. The control unit 65 can monitor the sensor or sensors and for example can prevent actuation of the ramp until the handbrake is on and the vehicle speed is less than a predetermined speed for example 5 kmh$^{-1}$.

In an embodiment of the invention the control unit prevents deployment of the ramp unless the vehicle is moving at less than 5 kmh$^{-1}$, the handbrake is on and the doors are closed.

To deploy the ramp a deployment switch is pressed and held until the ramp is fully deployed. Release of the deployment switch causes the control unit to retract the ramp. When the ramp is fully extended the deployment switch can be released and the doors opened. The control unit may actuate a ramp extended warning indicator. A warning signal for example visual and/or audible may be given during deployment.

To retract the ramp the control unit monitors the handbrake and the doors. Retraction can not be performed unless the doors are shut and the handbrake is on. Redeployment can be prevented until a time delay for example 10 seconds has expired.

A number of ways of reducing the likelihood of the vehicle being driven while the ramp is extended can be provided. They can include one or more of a warning signal for example visual and/or audible, the control unit could actuate the vehicle's brakes such as the handbrake could prevent engagement of the vehicle drive and/or could prevent an engine speed from being increased above a particular level.

In some embodiments of the invention the vehicle must be stationary before the ramp can be deployed.

Other ways of detecting an obstruction either alone or in combination with those previously described can be used. An example is providing a resettable fuse for example one employing positive temperature coefficient materials. When the motor draws too high a current for example following contact with an obstruction the fuse trips. This prevents the motor from working. The control unit monitors the fuse tripping and when power is restored retracts the ramp. A further example provides a member carried by the ramp on a resilient portion of the ramp such that if the ramp abuts an obstruction the member moves relative to other parts of the movable ramp. Abutment causes the member to actuate a switch stop or reversing the ramp. A still further example transposes the position of the switch and member.

What is claimed is:

1. An extendible ramp assembly for use with a vehicle comprising:
   i) a cassette attachable to a vehicle and provided with a closable access slot;
   ii) a first ramp contained by the cassette, the first ramp being slidably movable relative to the cassette and hingably connected to the cassette;
   iii) a second ramp contained within the first ramp and movable relative to the cassette and the first ramp;
   iv) electric motor means for extending and retracting the first ramp through the access slot and relative to the cassette;
   v) means for extending and retracting the second ramp relative to the first ramp and the cassette;
   vi) a control unit for controlling the operation of the electric motor means and the means for extending and retracting the second ramp;
   vii) means for detecting the current drawn by the electric motor means to ascertain when the current drawn exceeds a predetermined value indicative of a condition in which the first and second ramps encounter an obstruction when being extended;
   viii) means responsive to the current detecting means for causing the control unit to stop the extension of the first and second ramps when the detecting means detects said excess current;
   ix) means for further detecting when the first and second ramps are fully extended and operational and;
   x) means responsive to the further detecting means for stopping the extension of the first and second ramps when the further detecting means detects the ramps are fully extended.

2. An extendible ramp assembly as claimed in claim 1 wherein the means responsive to the current detecting means further causes the control unit to retract the first and second ramps when the detecting means detects said excess current.

3. An extendible ramp assembly as claimed in claim 1 wherein the second ramp is resiliently biased against a switch such that when the load on the means for extending and retracting the second ramp exceeds a predetermined value the switch is activated.

4. An extendible ramp assembly as claimed in claim 3 further comprising means responsive to the switch for causing the control unit to stop the extension of the second ramp when the switch is activated.

5. An extendible ramp assembly as claimed in claim 3 further comprising means responsive to the switch for causing the control unit to retract the second ramp when the switch is activated.

6. An extendible ramp assembly as claimed in claim 1 and further comprising means for extending and retracting the first and second ramps manually.

7. An extendible ramp assembly as claimed in claim 6 further comprising a tool for facilitating the use of means for extending and retracting the first and second ramps manually.

8. An extendible ramp assembly as claimed in claim 7 wherein means for extending and retracting both the first and second ramps include a feed nut and a lead screw and means for extending and retracting the first and second ramps manually comprise dogs.

9. An extendible ramp assembly as claimed in claim 1 and further comprising at least one resiliently biased flap connected to the cassette and biased so as to close the access slot so as to reduce the step between the first ramp and the cassette when the first ramp is in the extended position and to close the slot when the first and second ramps are in the fully retracted position.

10. An extendible ramp assembly as claimed in claim 1 and further comprising means for detecting the condition of a vehicle, in which the ramp assembly is installed.

11. An extendible ramp assembly as claimed in claim 10 further comprising means responsive to the condition detecting means for causing the control unit to stop the extension of the first and second ramps when the detecting means detect the vehicle is in a certain condition.

12. An extendible ramp assembly as claimed in claim 10 further comprising means responsive to the condition detecting means for causing the control unit to activate a warning signal.

* * * * *